(12) United States Patent
Nishikawa et al.

(10) Patent No.: US 9,152,289 B2
(45) Date of Patent: Oct. 6, 2015

(54) INSTALLATION STRUCTURE OF THIN-TYPE DISPLAY AND RESISTIVE FILM TYPE TOUCH PANEL, RESISTIVE FILM TYPE TOUCH PANEL UNIT WITH FRONT-SURFACE PROTRUSIONS, AND THIN-TYPE DISPLAY UNIT WITH BACK-SURFACE PROTRUSIONS

(75) Inventors: Kazuhiro Nishikawa, Kyoto (JP); Takakuni Sunahase, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 56 days.

(21) Appl. No.: 13/512,161

(22) PCT Filed: Dec. 9, 2010

(86) PCT No.: PCT/JP2010/072078
§ 371 (c)(1),
(2), (4) Date: May 25, 2012

(87) PCT Pub. No.: WO2011/071096
PCT Pub. Date: Jun. 16, 2011

(65) Prior Publication Data
US 2012/0299872 A1    Nov. 29, 2012

(30) Foreign Application Priority Data
Dec. 11, 2009    (JP) .................. 2009-281063

(51) Int. Cl.
*G06F 3/045* (2006.01)
*G02F 1/1333* (2006.01)
*G02F 1/167* (2006.01)

(52) U.S. Cl.
CPC ............ *G06F 3/045* (2013.01); *G02F 1/13338* (2013.01); *G02F 1/167* (2013.01)

(58) Field of Classification Search
CPC ...... G09G 3/344; G09G 3/3446; G09G 3/041; G09G 3/0412; G09G 3/0414; G09G 3/045; G02F 1/167; G02F 1/13; G02B 26/026; H03K 17/9645
USPC .................. 345/173–178, 104, 107; 178/18.01–18.09, 18.11; 359/296
See application file for complete search history.

(56) References Cited

U.S. PATENT DOCUMENTS

| 6,124,851 A | 9/2000 | Jacobson |
| 6,680,725 B1 | 1/2004 | Jacobson |

(Continued)

FOREIGN PATENT DOCUMENTS

| CN | 1926501 | 3/2007 |
| CN | 101231405 | 7/2008 |

(Continued)

OTHER PUBLICATIONS

International Search Report issued Mar. 15, 2011 in International (PCT) Application No. PCT/JP2010/072078.
Wendy Fang, Texas Instruments Inc., "Reducing Analog Input Noise in Touch Screen Systems", Application Report, pp. 1-12, SBAA155A, Jul. 2007—Revised Sep. 2007.
Chinese Office Action (OA) and Search Report (SR) issued Feb. 18, 2013 in Chinese Patent Application No. 201080055536.3.
Extended European Search Report issued Aug. 27, 2014 in European Application No. 10836016.5.

(Continued)

*Primary Examiner* — Stephen Sherman
(74) *Attorney, Agent, or Firm* — Wenderoth, Lind & Ponack, L.L.P.

(57) ABSTRACT

An installation structure of electronic paper and a resistive film type touch panel, includes electronic paper, a resistive film type touch panel disposed on a back surface side of the electronic paper, and a multitude of protrusions that are disposed between the electronic paper and the resistive film type touch panel, and that are fixed to at least one of the electronic paper and the resistive film type touch panel.

10 Claims, 15 Drawing Sheets

(56) References Cited

U.S. PATENT DOCUMENTS

| | | |
|---|---|---|
| 7,956,939 B2 | 6/2011 | Kubota et al. |
| 8,004,501 B2 | 8/2011 | Harrison |
| 8,031,275 B2 * | 10/2011 | Lee .................. 349/12 |
| 8,248,386 B2 | 8/2012 | Harrison |
| 8,441,463 B2 | 5/2013 | Harrison |
| 8,451,249 B2 | 5/2013 | Burns et al. |
| 2002/0090798 A1 * | 7/2002 | Ahn et al. ............ 438/455 |
| 2003/0184528 A1 | 10/2003 | Kawasaki et al. |
| 2004/0090426 A1 * | 5/2004 | Bourdelais et al. ...... 345/173 |
| 2004/0090429 A1 * | 5/2004 | Geaghan et al. ........ 345/173 |
| 2005/0007339 A1 | 1/2005 | Sato |
| 2005/0174335 A1 | 8/2005 | Kent et al. |
| 2007/0085838 A1 | 4/2007 | Ricks et al. |
| 2008/0067699 A1 * | 3/2008 | Tamaki .................. 257/787 |
| 2008/0180585 A1 | 7/2008 | Kubota et al. |
| 2009/0174832 A1 | 7/2009 | Lee |
| 2009/0256819 A1 | 10/2009 | Jung |
| 2010/0259490 A1 * | 10/2010 | Lee .................. 345/173 |
| 2013/0265280 A1 | 10/2013 | Burns et al. |

FOREIGN PATENT DOCUMENTS

| | | |
|---|---|---|
| CN | 101248411 | 8/2008 |
| JP | 2003-296022 | 10/2003 |
| JP | 3901197 | 4/2007 |
| JP | 2007-322587 | 12/2007 |
| JP | 2008-181438 | 8/2008 |
| JP | 2009-199558 | 9/2009 |
| KR | 2008-0027891 | 3/2008 |
| KR | 2009-0108352 | 10/2009 |
| TW | 200941312 | 10/2009 |
| WO | 2007/012899 | 2/2007 |

OTHER PUBLICATIONS

Database WPI, Week 200807, Thomson Scientific, London, GB; AN 2008-B05840, XP002728589, Dec. 13, 2007.

* cited by examiner

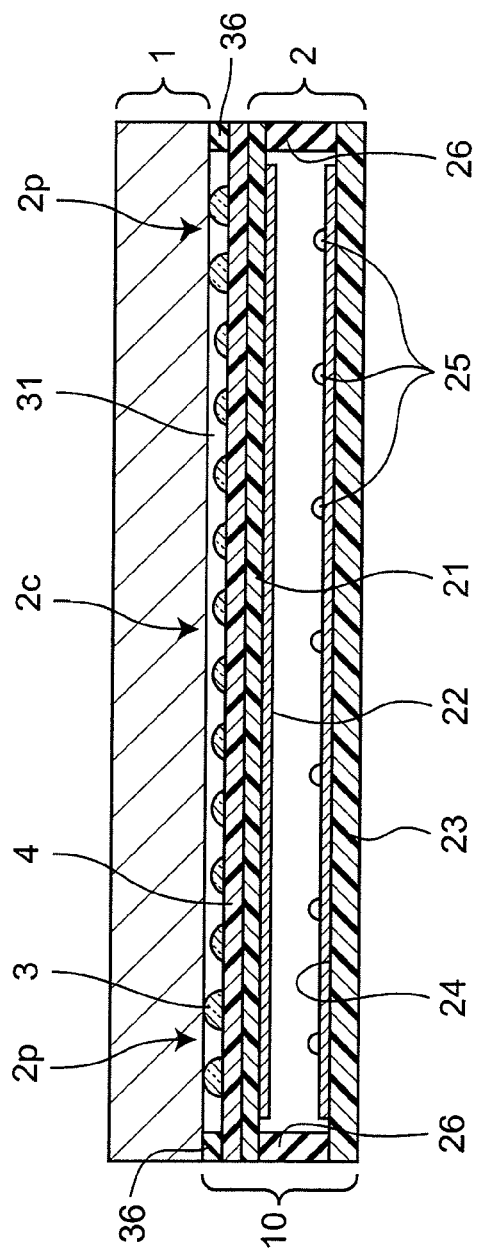

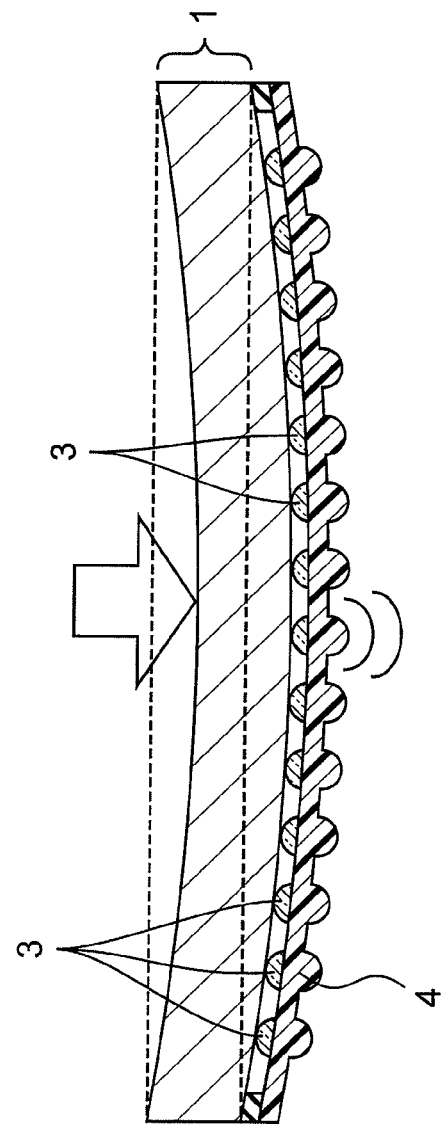

INSTALLATION STRUCTURE OF THIN-TYPE DISPLAY AND RESISTIVE FILM TYPE TOUCH PANEL, RESISTIVE FILM TYPE TOUCH PANEL UNIT WITH FRONT-SURFACE PROTRUSIONS, AND THIN-TYPE DISPLAY UNIT WITH BACK-SURFACE PROTRUSIONS

TECHNICAL FIELD

The present invention relates to an installation structure of a thin-type display and a resistive film type touch panel, and a resistive film type touch panel unit with front-surface protrusions and a thin-type display unit with back-surface protrusions both of which are used for the installation structure of a thin-type display and a resistive film type touch panel, all of which exhibit excellent visibility of the thin-type display, and with which an input with a pen or a finger is carried out easily.

BACKGROUND ART

Conventionally, there is a display media referred to as electronic paper. The electronic paper maintains visibility and portability which are regarded as the advantage of paper, and allows the displayed content to be electrically rewritten. The representative display technique of the electronic paper is the electrophoretic system. Electronic paper 101 of this system is developed by E Ink Corporation, US. In the electronic paper 101 of this scheme, each microcapsule 43 accommodates white particles, black particles, and fluid. The white particles and the black particles are shifted by an electric field, whereby a black-and-white display is presented (see Patent Document 1). More specifically, in each transparent microcapsule 43 having a diameter of about 40 μm, positively charged white pigment particles 44 and negatively charged black pigment particles 45 are accommodated with a transparent dispersion medium (oil) 46. The capsules are each structured with only a single thin layer, and are aligned between two narrow electrode plates without any space. One side of the electrode serving as the display surface (front surface layer) 41 is made of a transparent electrode 42 such as ITO, and an electrode 47 on the opposite side is supported by a support layer 48, and is structured with fine rectangular electrodes having the display resolution of a required degree (see FIG. 3). By application of voltage from an external control circuit, an electric field generates between the two electrodes 42 and 47, and the positively and negatively charged white and black pigment particles 44 and 45 migrate in the oil 46. Then, the pigment particles 44 or 45 of the color selected by the voltage gather on the display surface side of the capsule 43, to present black and white display. For each display is selected. For example, in FIG. 3, white color is displayed by external light 49 (see reference character 50), and black color is displayed by the external light 49 (see reference character 51). Since the pigment particles 44 and 45 do not easily move even when the voltage is turned off, it can be read as printed matter.

For its characteristics such as low power consumption and high visibility, products using the electronic paper, e.g., various mobile phones, electronic book readers, are now commercially available, and are so popular that they are introduced into digital signage. In addition, what is coming into use lately is application of a touch panel to the electronic paper.

Meanwhile, since the electronic paper 101 presents display using reflected light similarly to paper, electronic paper 101 has a wide viewing angle. Even when the electronic paper 101 is irradiated with direct sunlight, electronic paper 101 is easily recognizable and puts less burden on the eyes. However, as described above, when the resistive film type touch panel 102 is disposed on the front surface side of the electronic paper 101, light reflects off the front surface of the resistive film type touch panel 102, between the electrodes thereof, the back surface thereof, and the like (see FIG. 4). This invites a problem that the excellent visibility that is inherent to the electronic paper 101 is impaired, and burden on the eyes is great.

On the other hand, there is another technique in which a capacitive type touch panel is disposed on the back surface side of the electronic paper. In this case, since the electronic paper is positioned at the topmost surface, visibility will not be impaired. However, with the capacitive type touch panel, an input cannot be carried out with a pen.

Accordingly, currently, it is required to dispose the resistive film type touch panel 102 on the back surface side of the electronic paper 101 (see FIG. 5), such that an input is entered via the electronic paper 101.

CITATION LIST

Patent Literature

Patent Literature 1: Patent Publication No. 3901197

SUMMARY OF INVENTION

Technical Problem

However, in the case where the resistive film type touch panel 102 is disposed on the back surface side of the electronic paper 101, normally, when a load is applied onto the front surface of the electronic paper 101, deformation occurs entirely and evenly due to the rigidity of the electronic paper 101. Then, the response to an input to the resistive film type touch panel 102 disposed on the back surface side slows down. Further, there is also a problem that an input can only be entered at the central portion of the electronic paper 101 (see FIG. 6). Still further, even when a load is applied at one point on the front surface of the central portion of the electronic paper 101, the surrounding of the point also evenly deforms. Thus, there is also a problem that the movable electrode 122 of the movable electrode film 121 is brought into contact with the fixed electrode 124 of the fixed electrode-supporting member 123 not in a point-like manner, but in a plane-like manner, and an input precision becomes poor (see FIG. 7).

Accordingly, an object of the present invention is to solve the problems stated above, and to provide an installation structure of a thin-type display and a resistive film type touch panel, and a resistive film type touch panel unit with front-surface protrusions and a thin-type display unit with back-surface protrusions both of which are used for the installation structure of a thin-type display and a resistive film type touch panel, all of which exhibit excellent visibility of the electronic paper, and with which an input with a pen or a finger is carried out easily.

Solution to Problem

In order to achieve the object stated above, the present invention is structured as follows.

In order to solve the technical problems stated above, the present invention provides an installation structure of a thin-type display and a resistive film type touch panel, a resistive film type touch panel unit with front-surface protrusions, and a thin-type display unit with back-surface protrusions having the following structure.

According to a first aspect of the present invention, there is provided an installation structure of a thin-type display and a resistive film type touch panel, comprising:

a paper-like thin-type display;

a resistive film type touch panel that is disposed on a back surface side of the thin-type display; and a multitude of protrusions that are disposed between the thin-type display and the resistive film type touch panel and that are fixed to one of the thin-type display and the resistive film type touch panel.

According to a ninth aspect of the present invention, there is provided a resistive film type touch panel unit with front-surface protrusions to be used for the installation structure according to the above aspect, comprising:

the resistive film type touch panel; and the multitude of protrusions that are fixed on a front surface side of the resistive film type touch panel.

According to a tenth aspect of the present invention, there is provided a thin-type display unit with back-surface protrusions to be used for the installation structure according to the above aspect, comprising:

the thin-type display; and the multitude of protrusions that are fixed on a back surface side of the thin-type display.

Advantageous Effects of Invention

According to the present invention, the installation structure of a thin-type display and a resistive film type touch panel includes: a resistive film type touch panel that is disposed on the back surface side of a thin-type display; and a multitude of protrusions disposed between the thin-type display and the resistive film type touch panel, and are fixed to one of the thin-type display and the resistive film type touch panel. Accordingly, even in a case where a normal load is applied to the front surface of the thin-type display and deformation occurs evenly on the entire thin-type display due to the rigidity of the thin-type display, the protrusions locally push in the movable electrode film of the resistive film type touch panel. That is, an input is carried out just like the manner in which an input is carried out with a finger or a stylus pen directly to the movable electrode film of the resistive film type touch panel. Accordingly, an input can easily be carried out. As a result, a point-like input can easily and surely be carried out.

Further, the resistive film type touch panel unit with front-surface protrusions or the thin-type display unit with back-surface protrusions of the present invention can be used for the installation structure of a thin-type display and a resistive film type touch panel described above, and can exhibit the operation and effect described above.

BRIEF DESCRIPTION OF DRAWINGS

These and other aspects and features of the present invention will become clear from the following description taken in conjunction with the preferred embodiments thereof with reference to the accompanying drawings, in which:

FIG. 1E is a cross-sectional view showing one example of an installation structure of electronic paper and a resistive film type touch panel according to still another embodiment of the present invention;

FIG. 2A is a cross-sectional view showing a state of an input mode in the installation structure shown in FIG. 1A;

DESCRIPTION OF EMBODIMENTS

Figure 1A:
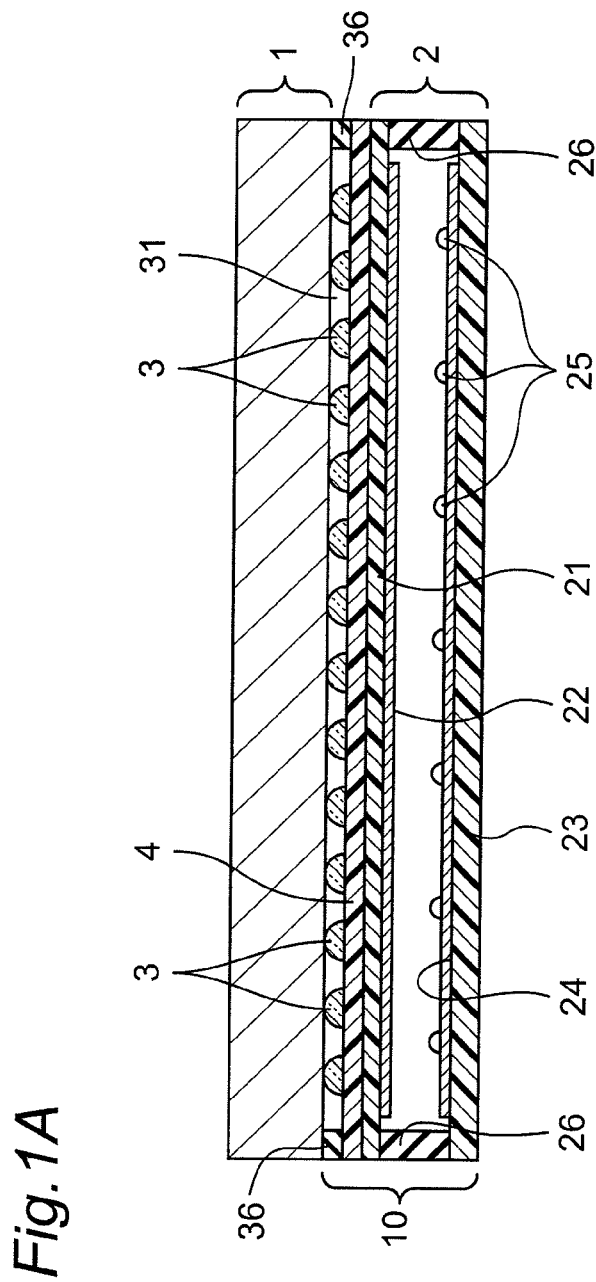
FIG. 1A is a cross-sectional view showing one example of the installation structure of electronic paper and a resistive film type touch panel according to one embodiment of the present invention.

Before the description of the present invention proceeds, it is to be noted that like parts are designated by like reference numerals throughout the accompanying drawings.

In the following, before describing embodiments of the present invention in detail with reference to the drawings, a description will be given of various aspects of the present invention.

According to a first aspect of the present invention, there is provided an installation structure of a thin-type display and a resistive film type touch panel, comprising:

a paper-like thin-type display;

a resistive film type touch panel that is disposed on a back surface side of the thin-type display; and a multitude of protrusions that are disposed between the thin-type display and the resistive film type touch panel and that are fixed to one of the thin-type display and the resistive film type touch panel.

According to a second aspect of the present invention, there is provided the installation structure of a thin-type display and a resistive film type touch panel according to the first aspect, wherein the multitude of protrusions are present more densely in a peripheral portion of the thin-type display and the resistive film type touch panel than in a central portion of the thin-type display and the resistive film type touch panel.

According to a third aspect of the present invention, there is provided the installation structure of a thin-type display and a resistive film type touch panel according to one of the first and second aspects, wherein the multitude of protrusions are greater in height in the peripheral portion of the thin-type display and the resistive film type touch panel than in the central portion of the thin-type display and the resistive film type touch panel.

According to a fourth aspect of the present invention, there is provided the installation structure of a thin-type display and a resistive film type touch panel according to one of the first and second aspects, wherein the multitude of protrusions are provided by molding one surface of a flexible sheet, and a surface of the flexible sheet opposite to a protrusion surface is entirely bonded to one of the thin-type display and the resistive film type touch panel.

According to a fifth aspect of the present invention, there is provided the installation structure of a thin-type display and a resistive film type touch panel according to one of the first and second aspects, wherein the multitude of protrusions are formed by application and curing of a light-curable resin to one side of a flexible sheet, and a surface of the flexible sheet opposite to a projection formed surface is entirely bonded to one of the thin-type display and the resistive film type touch panel.

According to a sixth aspect of the present invention, there is provided the installation structure of a thin-type display and a resistive film type touch panel according to the first and second aspects, wherein the multitude of protrusions are formed by direct application and curing of a light-curable resin to one of the thin-type display and the resistive film type touch panel.

According to a seventh aspect of the present invention, there is provided the installation structure of a thin-type display and a resistive film type touch panel according to any one of the first to sixth aspects, wherein each of the multitude of protrusions is shaped dome-like.

According to an eighth aspect of the present invention, there is provided the installation structure of a thin-type display and a resistive film type touch panel according to any one of the first to seventh aspects, wherein each of the protrusions has a diameter of 1 to 2 mm and a height of 100 to 1000 µm, and an interval between adjacent ones of the protrusions falls within a range of 1 to 2 mm.

According to a ninth aspect of the present invention, there is provided a resistive film type touch panel unit with front-surface protrusions to be used for the installation structure according to any one of the first to eighth aspects, comprising:

the resistive film type touch panel; and the multitude of protrusions that are fixed on a front surface side of the resistive film type touch panel.

According to a tenth aspect of the present invention, there is provided a thin-type display unit with back-surface protrusions to be used for the installation structure according to any one of the first to eighth aspects, comprising:

the thin-type display; and the multitude of protrusions that are fixed on a back surface side of the thin-type display.

In the following, with reference to the drawings, a description will be given of embodiments of the present invention.

Figure 1B:
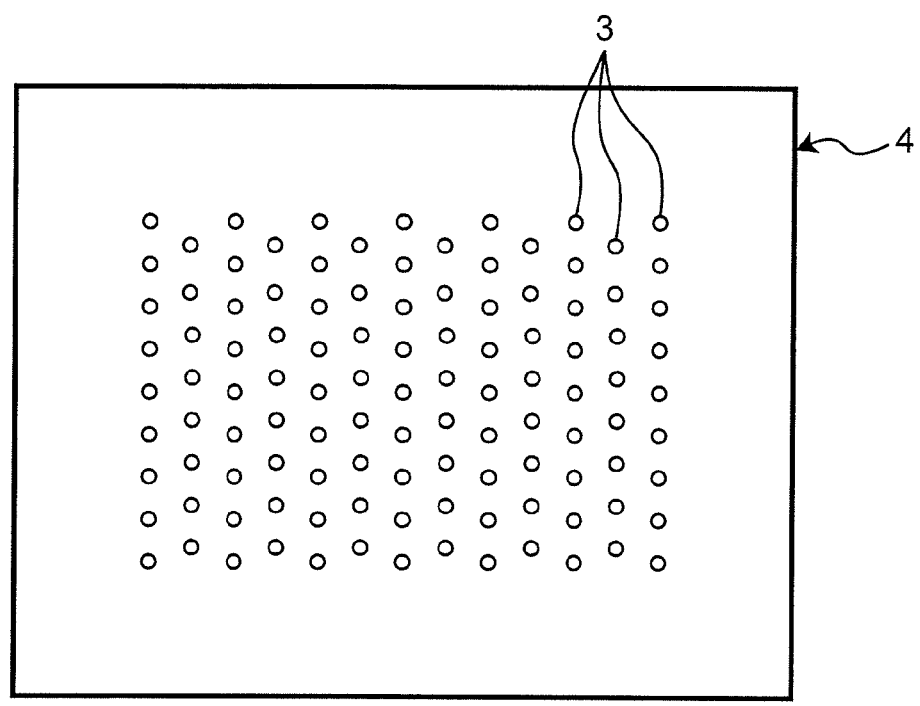
FIG. 1B is a plan view of a flexible sheet with protrusions in the installation structure of the electronic paper and the resistive film type touch panel according to the embodiment shown in FIG. 1A.
Figure 2B:
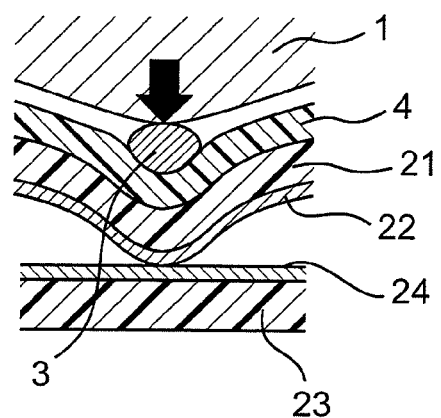
FIG. 2B is a partially enlarged cross-sectional view in a state of an input mode in the installation structure shown in FIG. 1A.

FIG. 1A is an exploded perspective view showing one example of an installation structure of electronic paper and a resistive film type touch panel as one example of a paper-like thin-type display according to one embodiment of the present invention. FIG. 1B is a plan view of a flexible sheet with protrusions in the installation structure of the electronic paper and the resistive film type touch panel according to the embodiment shown in FIG. 1A. FIG. 2A is a view showing a state of an input mode in the installation structure shown in FIG. 1A. The installation structure shown in FIG. 2A includes an electronic paper 1, a resistive film type touch panel 2 disposed on the back surface side of the electronic paper 1, and a multitude of protrusions 3 disposed between the electronic paper 1 and the resistive film type touch panel 2.

As shown in FIG. 1B, a multitude of protrusions 3 are formed by applying and curing a light-curable resin so as to be disposed on one surface of the flexible sheet 4, e.g., uniformly. Further, the surface of the flexible sheet 4 opposite to the projection formed surface is entirely bonded to the front surface of the resistive film type touch panel 2 to structure a resistive film type touch panel unit with front-surface protrusions 10. The projection formed surface of the flexible sheet 4 is bonded to the back surface of the electronic paper 1 by a bonding layer 36 at the peripheral portion. The resistive film type touch panel unit with front-surface protrusions 10 structured in this manner can be used for the above-described installation structure of a thin-type display and a resistive film type touch panel, and the operation and effect of the installation structure, whose description will follow, can be achieved.

As to the electronic paper 1, the present invention can be applied to, in addition to the electrophoretic method, the electronic liquid powder method, the liquid crystal method, the chemical reaction method and the like as well, so long as such a method involves the problems of the conventional technique described above, which is attributed to the rigidity of the electronic paper 1. It is to be noted that, the rigidity is the greatest in a case where a glass sheet is used in the structure of the electronic paper 1.

In general, the resistive film type touch panel 2 is structured such that a movable electrode film 21 having a movable electrode 22 formed on one surface (the lower surface in FIG. 1A) and a fixed electrode-supporting member 23 having a fixed electrode 24 formed on one surface (the upper surface in FIG. 1A) face each other, so that their respective surfaces where the movable electrode 22 and the fixed electrode 24 are formed face each other with a plurality of spacers 25 interposed between them.

The movable electrode film 21 is structured with a transparent film. As the movable electrode film 21, for example, a transparent film structured with polyethylene terephthalate resin, polycarbonate resin, cellulose resin, triacetate resin, polyether sulfone resin, or the like can be used. The thickness of the movable electrode film 21 is preferably about 100 to 1000 µm. Further, the movable electrode film 21 may not be a single film, but may be a laminate made up of a plurality of films being overlaid on one another.

The movable electrode 22 is formed using a transparent conductive film of metal such as gold, silver, copper, tin, nickel, or palladium; or of metal oxide such as tin oxide, indium oxide, antimony oxide, zinc oxide, cadmium oxide, or indium tin oxide (ITO). As the method of forming the movable electrode 22, vacuum deposition, sputtering, ion plating, CVD or the like can be used.

The fixed electrode-supporting member 23 is structured with a transparent film, a transparent glass, or the like. For example, a polyester film or a glass plate can be used as the fixed electrode-supporting member 23.

With reference to FIG. 1A, the fixed electrode 24 is formed on the upper surface of the fixed electrode supporting member 23. As the fixed electrode 24, a transparent conductive film of ITO or the like is used.

The spacers 25 are provided so as to keep a distance between the movable electrode 22 and the fixed electrode 24. The spacers 25 are formed on the movable electrode 22 or on the fixed electrode 24. The spacers 25 can be obtained by forming a transparent resin such as photosensitive acryl, photosensitive polyester, or the like into fine dots through photo-processing. Further, the spacers 25 can be obtained by forming a multitude of fine dots through printing.

In order to bond the movable electrode film 21 and the movable electrode 22, and the fixed electrode-supporting member 23 and the fixed electrode 24 at their periphery, a peripheral bonding layer 26 can be formed at one of or each of the peripheral portion on the lower surface of the movable electrode film 21 and the peripheral portion of the upper surface of the fixed electrode-supporting member 23, by applying an insulating adhesive agent made of acrylic resin, epoxy resin, phenol resin, vinyl resin, or the like. Further, an insulating sticky paste material such as a double-stick tape is also preferable as the peripheral bonding layer 26.

The flexible sheet 4 where the protrusions 3 are formed can be formed, similarly to the movable electrode film 21 of the resistive film type touch panel 2, using a transparent film structured with polyethylene terephthalate resin, polycarbonate resin, cellulose resin, triacetate resin, polyether sulfone resin, or the like. Further, as the flexible sheet 4, a rubber sheet may be used.

The light-curable resin that forms the protrusions 3 includes an electron beam curable resin and a UV curable resin. As to the electron beam curable resin, polyester acrylate, polyester urethane acrylate, epoxy acrylate, polyol acrylate, or the like to which photopolymerizable monomer such as pentaerythritol acrylate, trimethylolpropane triacrylate, or the like is added can be used. Further, as to the UV curable resin, polyester acrylate, polyester urethane acrylate, epoxy acrylate, polyol acrylate, or the like to which, as a photoinitiator, acetophenone-base, benzoin ether-base, benzyl ketal-base, or ketone-base initiator, or a reactive diluent made of mono-, di-, trivinyl compound such as hydroxyethyl acrylate, diethylene glycol dimethacrylate, or the like can be used. In applying the light-curable resin, a dispenser, screen printing technique, or the like is used.

A multitude of protrusions 3 are disposed between the electronic paper 1 and the resistive film type touch panel 2, and the flexible sheet 4 provided with the protrusions 3 is fixed to the front surface of the resistive film type touch panel 2. Thus, even in a case where a load is applied onto the front surface of the electronic paper 1 and thus the whole electronic paper 1 deforms evenly as in a normal case due to the rigidity of the electronic paper 1, the protrusions 3 locally pushes in the movable electrode film 21 of the resistive film type touch panel 2. That is, an input is carried out with a finger or a stylus pen directly to the movable electrode film 21 of the resistive film type touch panel 2 in a point-like manner, instead of a plane-like manner (see FIGS. 2A and 2B).

The shape of each of the protrusions 3 is dome-like, because the protrusions 3 are formed by application and curing of the light-curable resin. As to the design dimension as one example, preferably, the diameter of each of the protrusions 3 is 1 to 2 mm, which is substantially as great as the tip of the stylus pen; and the height of the protrusions 3 falls within a range of 100 to 1000 μm, taking into consideration of the pressed-in amount when an input is carried out; and the interval between adjacent ones of the protrusions 3 is formed so as to fall within a range of 1 to 2 mm, taking into consideration of the input precision. Further, in the case where formation is made through application as described above, the height of 100 to 1000 μm cannot be attained when the diameter of each of the protrusions 3 is less than 1 mm. On the other hand, when the diameter of each of the protrusions 3 exceeds 2 mm, ink dripping occurs during application.

Figure 1C:
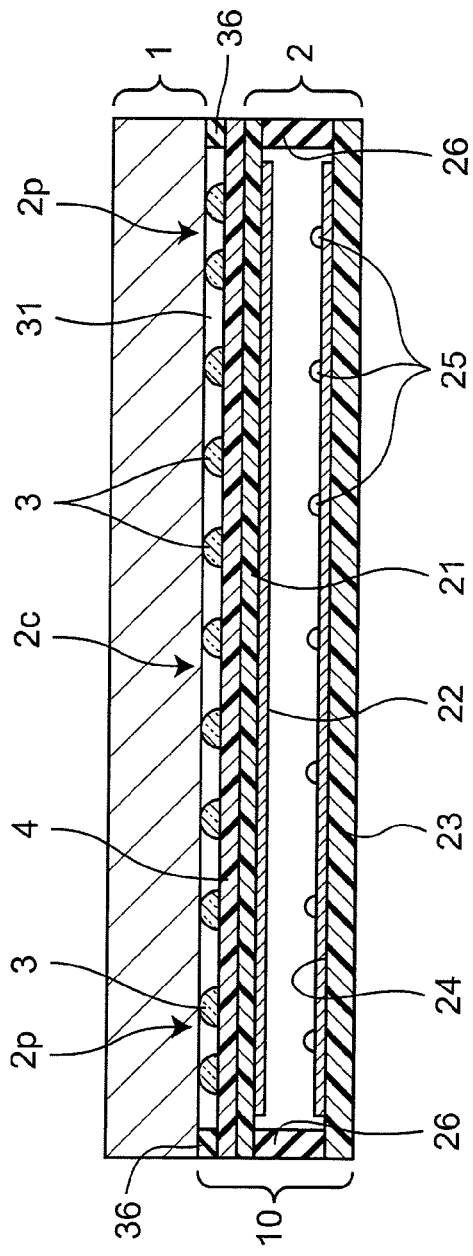
FIG. 1C is a cross-sectional view showing one example of the installation structure of electronic paper and a resistive film type touch panel according to another embodiment of the present invention.
Figure 1D:
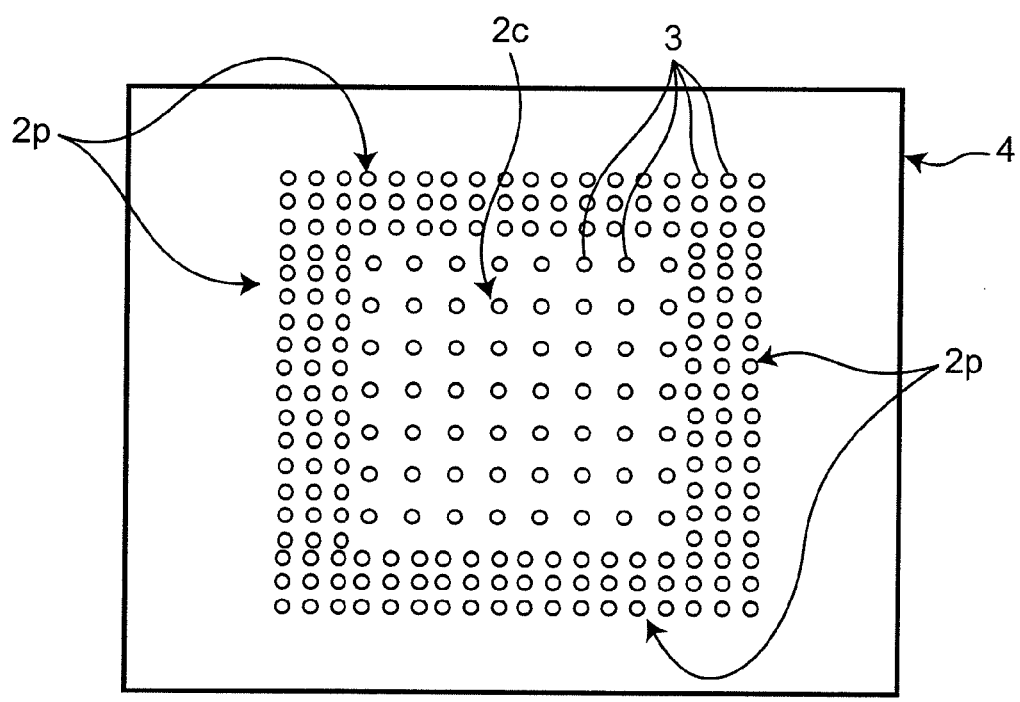
FIG. 1D is a plan view of a flexible sheet with protrusions in the installation structure of the electronic paper and the resistive film type touch panel according to the embodiment shown in FIG. 1C.

Further, as shown in FIGS. 1C and 1D, preferably, a multitude of protrusions 3 are formed so as to be present more densely in the peripheral portion 2p of the electronic paper 1 and the resistive film type touch panel 2 than the central portion 2c thereof. This is because of the following reason: when a load is applied to the front surface of the electronic paper 1, deformation does not easily occur at the peripheral portion 2p, and the effect of the protrusions 3 will not easily exhibited at the peripheral portion 2p when the disposition of the protrusions 3 are uniform as in FIGS. 1A and 1B. Here, the peripheral portion 2p means the region toward the inner side from the inner boundary of the wiring region by, e.g., about 10 mm. In the peripheral portion 2p, the protrusions 3 are densely disposed, and in the central portion 2c on the central side than the peripheral portion 2p, the protrusions 3 are sparsely disposed than in the peripheral portion 2p.

Further, as shown in FIG. 1E, instead of changing the disposition density as described above, a multitude of protrusions 3 may be formed so as to be greater in height in the peripheral portion 2p of the electronic paper 1 and the resistive film type touch panel 2 than in the central portion 2c thereof. This can achieve the effect similarly to that achieved by an increase in the disposition density of the protrusions 3. The disposition density of the protrusions 3 in this case will be the same as that shown in FIG. 1B. The height of each of the protrusions 3 disposed in the central portion 2c of the resistive film type touch panel 2 is substantially uniform, and the height of the protrusions 3 disposed in the peripheral portion 2p of the resistive film type touch panel 2 is substantially uniform.

Figure 1F:
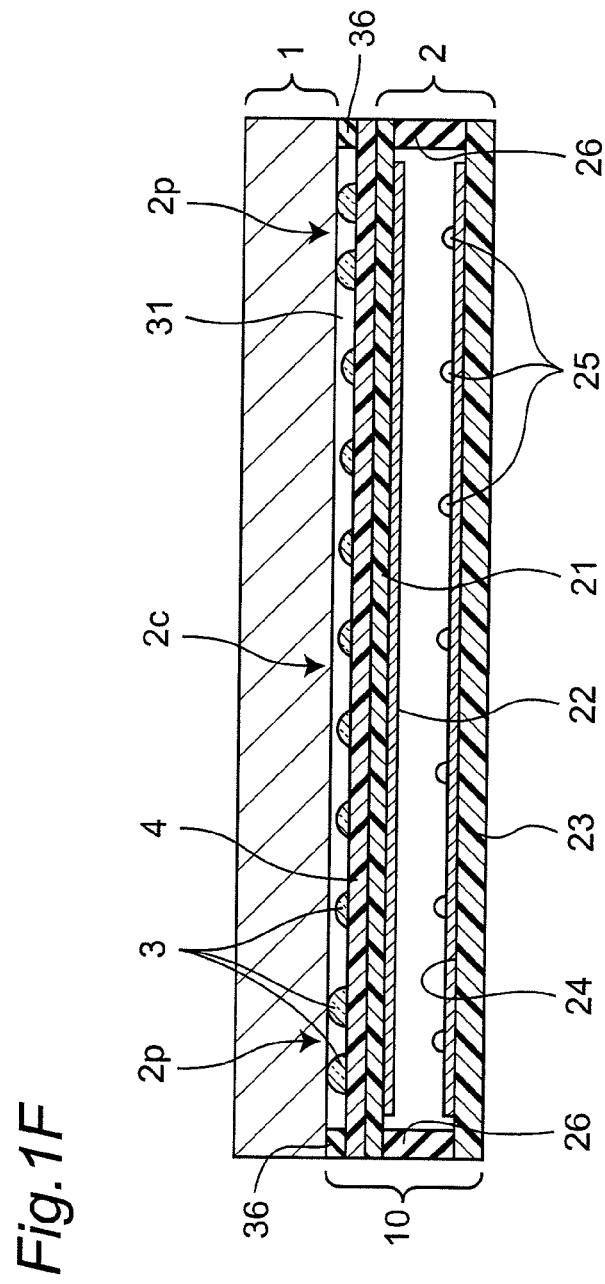
FIG. 1F is a cross-sectional view showing one example of an installation structure of electronic paper and a resistive film type touch panel according to still another embodiment of the present invention.

Further, as shown in FIG. 1F, both the height and the disposition density may be varied. That is, in FIG. 1F, the disposition density is set to be higher in the peripheral portion 2p than in the central portion 2c of the electronic paper 1 and the resistive film type touch panel 2, and to be greater in height in the peripheral portion 2p than in the central portion 2c. The disposition density of the protrusions 3 in this case is the same as that shown in FIG. 1D. The height of each of the protrusions 3 disposed in the central portion 2c of the resistive film type touch panel 2 is substantially uniform, and the height of each of the protrusions 3 disposed in the peripheral portion 2p of the resistive film type touch panel 2 is substantially uniform.

In order to bond the entire surface of the flexible sheet 4 opposite to the projection formed surface to the front surface of the resistive film type touch panel 2, an adhesive agent structured with acrylic resin or the like can be used (not shown).

According to each of the embodiments described above, the installation structure of the electronic paper 1 and the resistive film type touch panel 2 includes: the resistive film type touch panel 2 disposed on the back surface side of the electronic paper 1; and the multitude of protrusions 3 that are disposed between the electronic paper 1 and the resistive film type touch panel 2 and that are fixed to at least one of the electronic paper 1 and the resistive film type touch panel 2. Thus, in a case where a load is applied onto the front surface of the electronic paper 1 and thus the whole electronic paper 1 deforms evenly as in a normal case due to the rigidity of the electronic paper 1, the protrusions 3 locally pushes in the movable electrode film 4 of the resistive film type touch panel 2. That is, an input is carried out with a finger or a stylus pen to the resistive film type touch panel 2 like a direct input carried out to the movable electrode film 4. Accordingly, an input can easily be carried out.

In the foregoing, though the description has been given of the installation structure of the electronic paper and the resistive film type touch panel according to the plurality of embodiments of the present invention, the present invention is not limited to the foregoing embodiments, and various modifications can be made within the technical idea disclosed in the scope of the claim, the description, and the drawings.

For example, in the foregoing embodiments, the surface of the flexible sheet 4 opposite to the projection formed surface is entirely bonded to the front surface of the resistive film type touch panel 2. However, instead of the front surface of the resistive film type touch panel 2, the surface may entirely be bonded to the back surface of the electronic paper 1, to structure the electronic paper unit with back-surface protrusions 20. In this case, the projection formed surface of the flexible sheet 4 is bonded to the front surface of the resistive film type touch panel 2 at the peripheral portion by the bonding layer 36. The electronic paper unit with back-surface protrusions 20 structured in this manner can be used for the installation structure of the thin-type display and the resistive film type touch panel described above, and can achieve the foregoing operation and effect.

Further, a multitude of protrusions 3 may be provided by molding one surface of the flexible sheet 4, and the surface of the flexible sheet 4 opposite to the protrusion surface may entirely be bonded to one of the electronic paper 1 and the resistive film type touch panel 2. That is, a multitude of protrusions 3 and the flexible sheet 4 may integrally be formed through molding with molding resin.

Figure 1G:
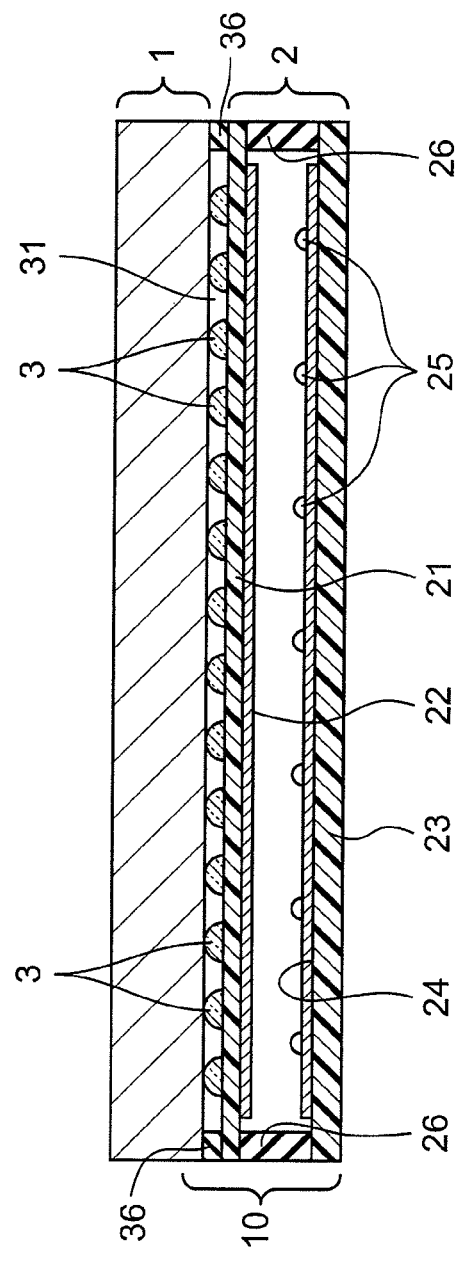
FIG. 1G is a cross-sectional view showing one example of an installation structure of electronic paper and a resistive film type touch panel according to still another embodiment of the present invention.

Still further, as shown in FIG. 1G, a multitude of protrusions 3 may be provided by direct application and curing of a light-curable resin to one of the electronic paper 1 and the resistive film type touch panel 2 without the flexible sheet 4. In this case, a reduction in thickness can be achieved as compared to the embodiments respectively shown in FIGS. 1A to 1F.

Figure 2C:
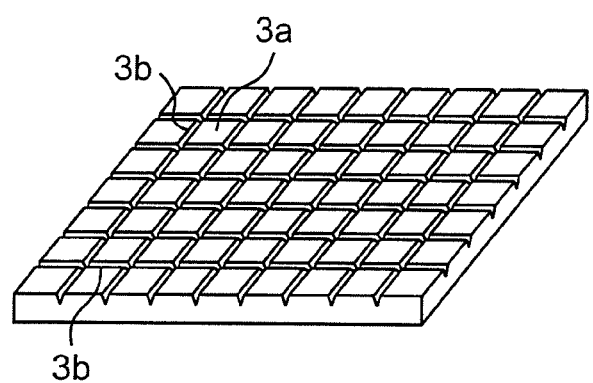
FIG. 2C is a perspective view showing another example of the protrusions in the installation structure shown in FIG. 1A.

Still further, the shape of each of a multitude of protrusions 3 is not limited to dome-like. For example, as shown in FIG. 2C, rectangular shaped protrusions 3a may be employed. In this case, the protrusion forming layer may be thickly formed to reach the height of the protrusions 3a, and thereafter, lateral and longitudinal grooves 3b may be formed, such that the portions surrounded by the lateral and longitudinal grooves 3b become the protrusions 3a.

Still further, in a case where a multitude of protrusions 3 are molded on one surface of the flexible sheet 4, what is present between the protrusion surface of the flexible sheet 4 and the electronic paper 1 or the resistive film type touch panel 2 may be a space 31 of an air layer. However, replacing the space with a soft bonding layer, durability of the protrusions 3 can be improved, and resistance against moisture can be improved so that degradation of touch panel or the like due to any moisture entering the space can be prevented.

Figure 2D:
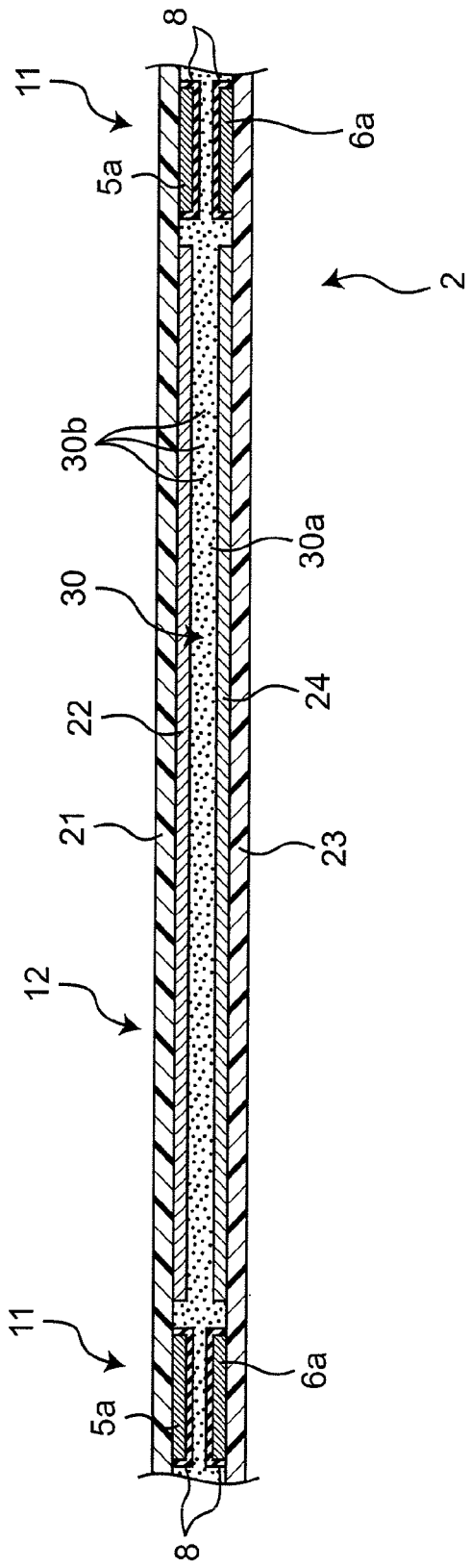
FIG. 2D is a cross-sectional view showing still another example of the protrusion in the installation structure shown in FIG. 1A.
Figure 3:
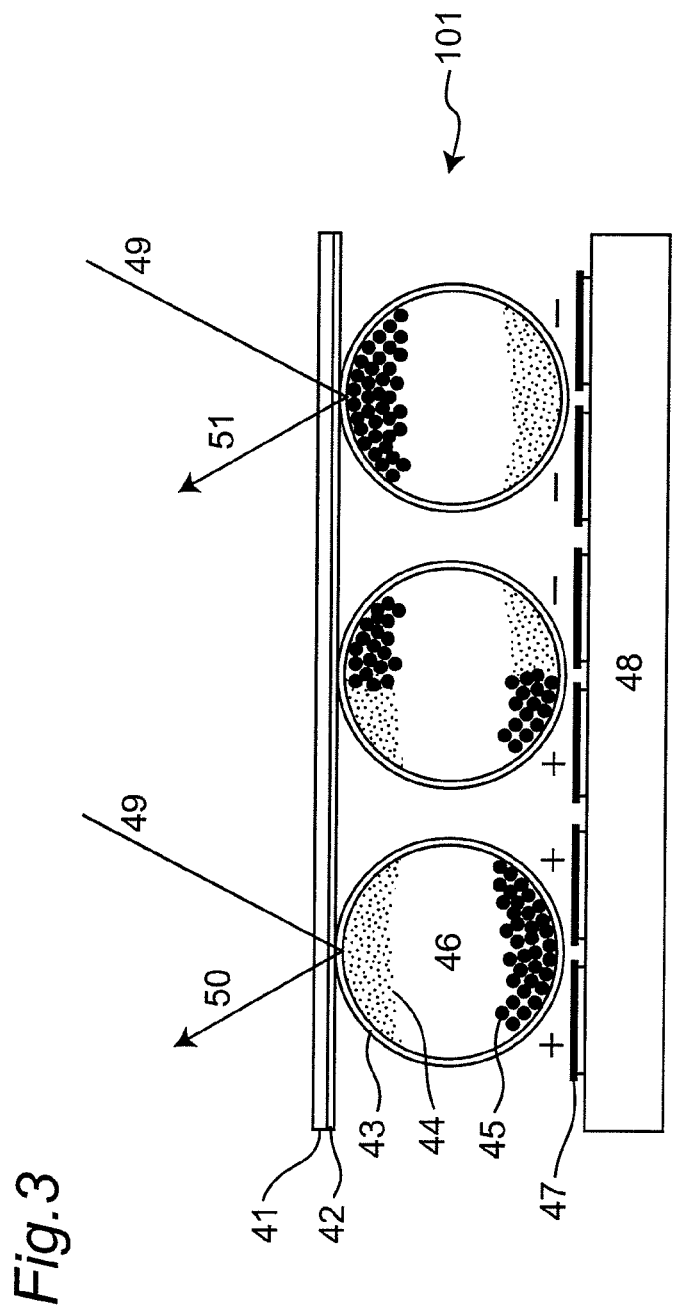
FIG. 3 is an explanatory view showing one example of the electronic paper.
Figure 4:
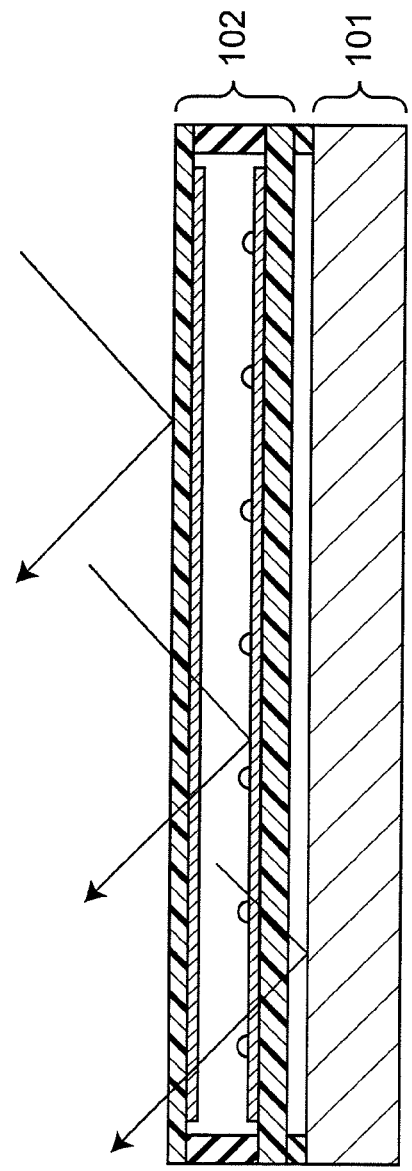
FIG. 4 is an explanatory view showing an example of disposing the resistive film type touch panel on the front surface side of the electronic paper.
Figure 5:
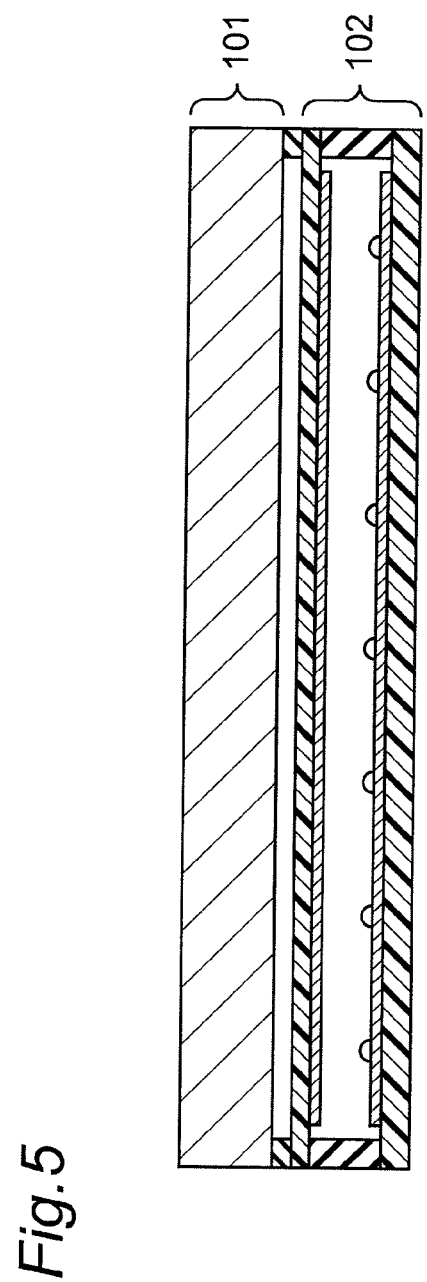
FIG. 5 is an explanatory view showing an example of disposing the resistive film type touch panel on the back surface side of the electronic paper.
Figure 6:
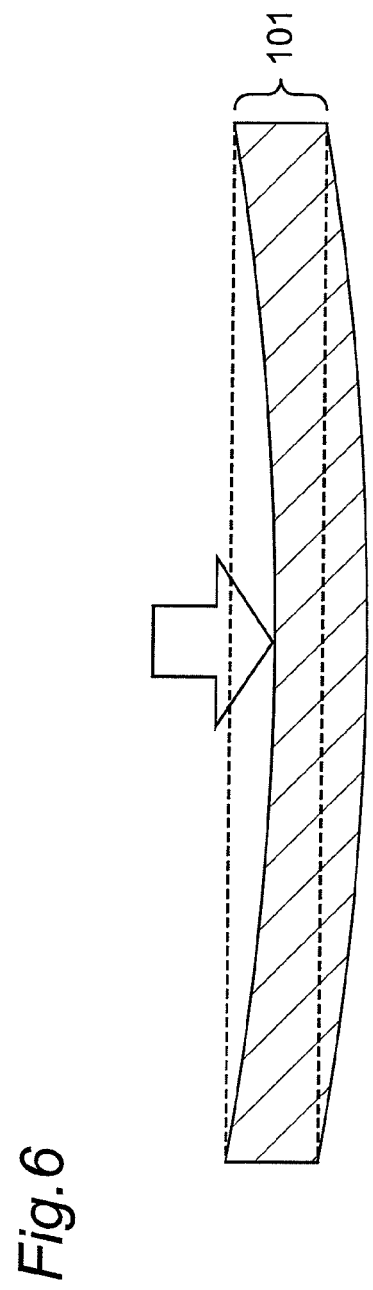
FIG. 6 is an explanatory view showing a change that occurs when a load is applied to the electronic paper in FIG. 5.
Figure 7:
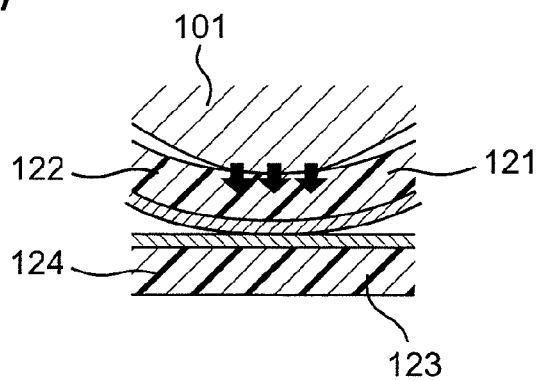
FIG. 7 is a cross-sectional view showing, in an enlarged manner, an input state at the timing where a load is applied to the electronic paper in FIG. 5.

Further, as shown in FIG. 2D, a pressure-sensitive ink layer 30 may be provided to the resistive film type touch panel 2. That is, to the surface of the fixed electrode 24 of the fixed electrode-supporting member 23 facing the movable electrode 22 of the movable electrode film 21, a pressure-sensitive ink layer 30 is disposed.

Further, the movable electrode film 21 is structured with a quadrilateral film having the movable electrode 22 at a prescribed position inside an input portion 12 on one surface (e.g., the lower surface of the movable electrode film 21 in FIG. 2D). At a quadrilateral frame-like frame portion 11 that is a periphery of the movable electrode film 21 and that surrounds the input portion 12, and that is the one surface of the periphery of the movable electrode 22 (e.g., the lower surface of the movable electrode film 21 shown in FIG. 2D), an upper routing electrode 5a formed by silver or the like through printing or the like and connected to the movable electrode 22 is disposed. The inside of the frame portion 11 structures the input portion 12 of the touch panel 2. The movable electrode film 21 is just required to: support the movable electrode 22; and have the electrical characteristic (such as linearity) which is equivalent to that of the transparent electrode base material of a normal touch panel; and possess the function of transferring the force acting on the other surface of the movable electrode film 21 (e.g., the upper surface of the movable electrode film 21 shown in FIG. 2D) to the pressure-sensitive ink layer 30 positioned below. Accordingly, flexibility is not necessarily a requirement for the movable electrode film 21. It is to be noted that, with the conventional touch panel, the electrode base material (film) is required to possess strength of a certain degree, so as not to be collapsed by the air layer. However, in the present embodiment, since the air layer is buried by the pressure-sensitive ink layer 30, a thinner film than a conventional one can be employed. The upper routing electrode 5a is covered by an insulating resist layer 8 except for the connection terminal portion, at the surface of the upper routing electrode 5a other than the bottom surface fixed to the movable electrode film 21, thereby realizing insulation such that the upper routing electrode 5a and the pressure-sensitive particles 30a in the pressure-sensitive ink layer 30 are not brought into conduction at the frame portion 11. This is to prevent conduction from being established at the frame portion 11 when the user intends to input at the input portion 12 and accidentally pushes the frame portion 11 against the user's intention.

The fixed electrode-supporting member 23 is structured with a quadrilateral film having the fixed electrode 24 on the surface facing the surface where the movable electrode 22 is disposed at a prescribed position inside the input portion 12 (e.g., the upper surface of the fixed electrode-supporting member 23 shown in FIG. 2D). The fixed electrode-supporting member 23 supports the fixed electrode 24, and has the electrical characteristic (such as linearity) which is equivalent to that of the transparent electrode base material of a normal touch panel. At the quadrilateral frame-like frame portion 11 surrounding the fixed electrode-supporting member 23, and that is the surface facing the surface on which the movable electrode is disposed and that surrounds the fixed electrode 24 (e.g., the upper surface of the fixed electrode-supporting member 23 shown in FIG. 2D), a lower routing electrode 6a formed by silver or the like through printing or the like and connected to the fixed electrode 24 is disposed. The lower routing electrode 6a is covered by the insulating resist layer 8 except for the connection terminal portion, at the surface of the lower routing electrode 6a other than the bottom surface fixed to the fixed electrode-supporting member 23, thereby realizing insulation such that the lower routing electrode 6a and the pressure-sensitive particles 30a in the pressure-sensitive ink layer 30 are not brought into conduction at the frame portion 11. This is to prevent conduction from being established at the frame portion 11 when the user intends to input at the input portion 12 and accidentally pushes the frame portion 11 against the user's intention.

The pressure-sensitive ink layer 30 is disposed entirely at a uniform thickness at least at the input portion 12 of the touch panel 2. As one example, as shown in FIG. 2D, the pressure-sensitive ink layer 30 is disposed so as to bury the entire space 31 between the movable electrode film 21 and the fixed electrode-supporting member 23, while bonding the movable electrode film 21 and the fixed electrode-supporting member 23 to be integrated therewith.

As shown in FIG. 2D, the pressure-sensitive ink layer 30 contains a multitude of electroconductive pressure-sensitive particles 30b dispersed in an insulating base material portion 30a. The material of the base material portion 30a of the pressure-sensitive ink layer 30 is a solid which is colorless and transparent, being insulating, and exhibiting excellent adhesiveness to the movable electrode 22 and the fixed electrode 24. Further, the solid does not erode the movable electrode 22 and the fixed electrode 24. Still further, the solid exhibits the bonding characteristic before and when thermally fixed under pressure, exhibiting no bonding characteristic at the ordinary temperature after thermally fixed under pressure. Still further, the solid is very little required to have elasticity. Further, the pressure-sensitive ink layer 30 is not limited to be thermosetting, and as will be described later, a non-thermosetting, such as ultraviolet curable, paste material can also be used.

For example, the thickness of the base material portion 30a of the pressure-sensitive ink layer 30 is thick enough for allowing a tunneling current to flow among the pressure-sensitive particles 30b, measuring several tens μm (e.g., 40 μm to 80 μm). The base material portion 30a is preferably formed by screen printing, for example. The thickness of the pressure-sensitive ink layer 30 is 40 μm or more from the viewpoint of manufacturability, and preferably up to 80 μm from the viewpoint of securing the effective flow of the tunneling current. Here, what is referred to by the tunneling current is an electric current flow formed by exuded electrons caused by the existence probability density of the electrons among the conductive particles being not zero, in a case where the conductive particles are not directly in contact with each other but are very close to each other on the order of nanometers. This is the phenomenon explained as the tunnel effect in quantum mechanics. An example of the specific material of the base material portion 30a of the pressure-sensitive ink layer 30 is a colorless and transparent paste (adhesive agent) with which the material of the pressure-sensitive ink layer 30 is not repelled by the transparent electrode surface of each of the movable electrode 22 and the fixed electrode 24 (i.e., with which a failure in applying the material of the pressure-sensitive ink layer 30 on the transparent electrode surface of each of the movable electrode 22 and the fixed electrode 24 due to poor wettability does not occur when the pressure-sensitive ink layer 30 is disposed on the transparent electrode surface of each of the movable electrode 22 and the fixed electrode 24), and that does not erode the movable electrode 22 and the fixed electrode 24. That is, the example of the specific material of the base material portion 30a is a solvent-base paste material. The example is a heat-seal use paste that can be fixed under pressure when heated, a thermosetting or ultraviolet curable bonding paste for a frame or the like, which does not ooze or protrude out from the edge of the resistive film type touch panel 2. That is, a bonding layer whose stickiness of the paste at the end portion is small (i.e., having no tackiness) is preferable. Specifically, as such a paste material, a solvent-base paste material commercially available from companies such as VIGte-Qnos Corporation, Diabond Industry Co., Ltd or the like can be employed.

The pressure-sensitive particles 30b may be particles that themselves do not deform, that are conductive to be capable of establishing electrical conduction, and that can be expected to exhibit the quantum tunnel effect whose description will follow. The particle size thereof may be the particle size suitable for printing. As one example, the pressure-sensitive particles may have the particle size that allows the particles to pass through the mesh without any resistance, when the screen printing is employed. An example of the specific material of the pressure-sensitive particles 30b may be QTC whose description will follow. The pressure-sensitive particles 30b are dispersed in the base material portion 30a in a range within which electric conduction can be established.

As one example, in the pressure-sensitive ink layer 30, a tunneling current flows through a plurality of pressure-sensitive particles 30b being close to one another out of a multitude of pressure-sensitive particles 30b being conductive particles contained in the pressure-sensitive ink layer 30, in accordance with application of pressure and irrespective occurrence of direct contact. This causes the pressure-sensitive ink layer 30 to enter a conductive state from an insulating state. One example of a composite structuring such a pressure-sensitive ink layer 30 is Quantum Tunneling Composite available under the trade name "QTC" from Peratech Limited (PERATECH LTD), Darlington, UK.

That is, when a force from a finger or a pen or the like acts on the front surface of the electronic paper 1, in other words, on the other surface side of the movable electrode film 21 (e.g., on the upper surface of the movable electrode film 21 shown in FIG. 1A), the acting force penetrates through the electronic paper 1, the protrusions 3, the flexible sheet 4, the movable electrode film 21, and the movable electrode 22 in the thickness direction, and is transferred to the pressure-sensitive ink layer 30. Thus, the tunnel effect occurs among the pressure-sensitive particles 30b in the pressure-sensitive ink layer 30, and a tunneling current flows among a plurality of pressure-sensitive particles 30b to establish electrical conduction between the movable electrode 22 and the fixed electrode 24. Thus, a change in the pressing force acting in the thickness direction (Z direction) of the resistive film type touch panel 2 can be detected by an XY-directional coordinates detecting unit 20 (see FIG. 8A) as a change in the resistance value (by converting the change into a change in the voltage), and the positional coordinates (XY coordinates) where the force acted upon the upper surface of the movable electrode film 21 can be detected.

In the XY-directional coordinates detecting unit 20, when a force acts upon the upper surface side of the movable electrode film 21, the movable electrode film 21 deflects by the acting force, and the movable electrode 22 of the movable electrode film 21 contacts the fixed electrode 24 via the pressure-sensitive ink layer 30. Then, a current flows among the pressure-sensitive particles 30b in the pressure-sensitive ink layer 30 to establish electrical conduction between the movable electrode 22 and the fixed electrode 24, and the XY-directional coordinates detecting unit 20 can detect the positional coordinates (XY positional coordinates) upon which the force acted upon, which exists along the upper surface of the movable electrode film 21. Specifically, the XY-directional coordinates detecting unit 20 is connected to the movable electrode 22 and to the fixed electrode 24, and in a state where voltage is applied from a power supply 20v across the terminals of the movable electrode 22, the XY-directional coordinates detecting unit 20 detects a change in the voltage between one terminal of the movable electrode 22 and one terminal of the fixed electrode 24, to thereby detect an X-directional positional coordinate. Next, in a state where application of the voltage across the terminals of the movable electrode 22 is stopped and thereafter the voltage from the power supply 20v is switched to be applied across the terminals of the fixed electrode 24, the XY-directional coordinates detecting unit 20 can detect a change in the voltage between the one terminal of the fixed electrode 24 and the one terminal of the movable electrode 22, to thereby detect a Y-directional positional coordinate.

It is to be noted that, though it has been described that, after the X-directional positional coordinate is detected in a state where the voltage is applied to the movable electrode 22, the Y-directional positional coordinate is detected in a state where the voltage is applied to the fixed electrode 24, the present invention is not limited thereto. Alternatively, after the Y-directional positional coordinate is detected in a state where the voltage is applied to the movable electrode 22, the X-directional positional coordinate may be detected in a state where the voltage is applied to the fixed electrode 24.

Figure 8A:
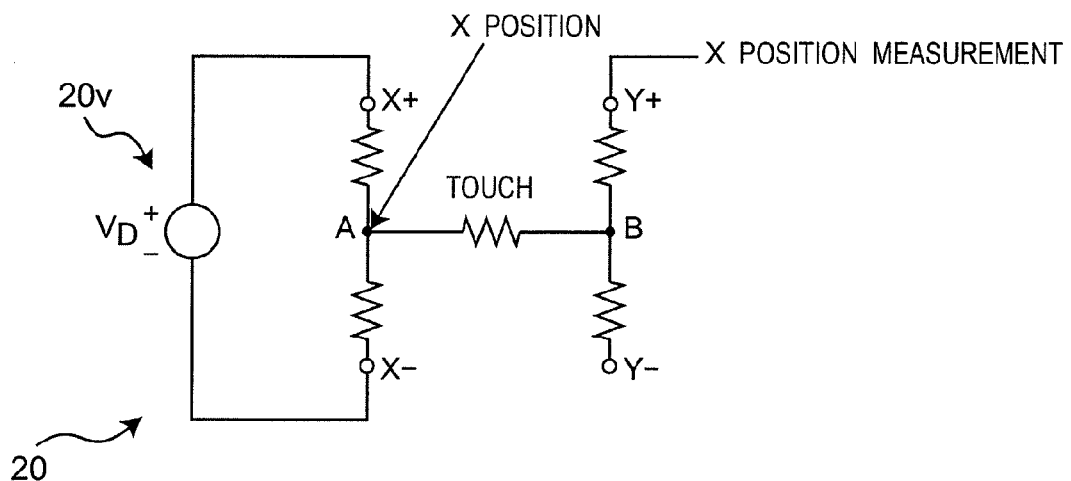
FIG. 8A is a view showing XY coordinate measurement in a plane of the resistive film scheme touch panel, describing that a panel drive voltage is applied from a power supply to the $X_+$ terminal and the $X_-$ terminal, whereby an X coordinate position can be read from the $Y_+$ terminal.
Figure 8B:
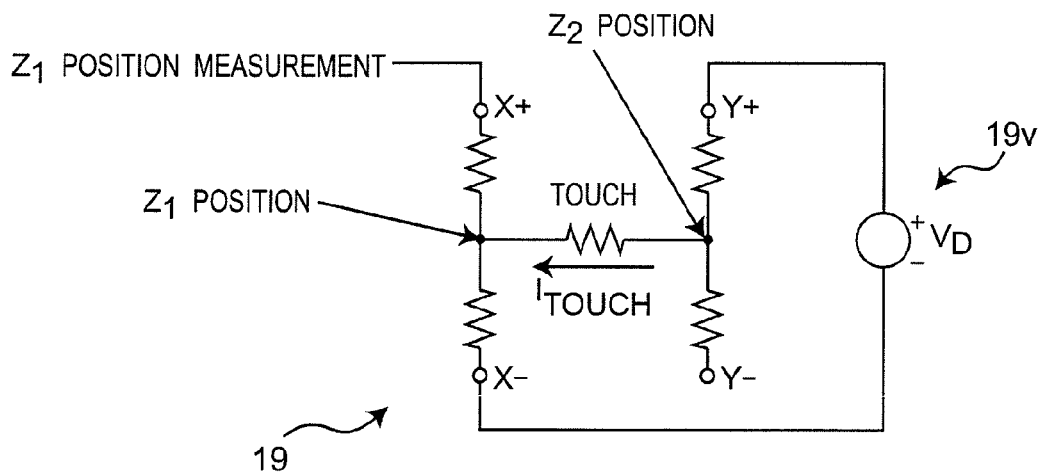
FIG. 8B is a view showing pressure measurement of the resistive film scheme touch panel, describing that a panel drive voltage is applied from a power supply to the $Y_+$ terminal and the $X_-$ terminal, whereby a $Z_1$ position can be read from the $X_+$ terminal, and a $Z_2$ position can be read from the $Y_-$ terminal.

On the other hand, the Z-directional position detection is carried out by a Z-directional position detecting unit 19 (see FIG. 8B). That is, when a force acts upon the upper surface of the movable electrode film 21, by the acting force, a current flows among the pressure-sensitive particles 30b in the pressure-sensitive ink layer 30, whereby the resistance value between the movable electrode 22 and the fixed electrode 24 changes, and the Z-directional position detecting unit 19 can detect a change in the magnitude of the force.

More specifically, the Z-directional position detecting unit 19 can detect a change in the magnitude of the force in the following manner (see "Reducing Analog Input Noise in Touch Screen Systems", on the website of Texas Instruments Incorporated).

That is, with the resistive film type touch panel 2, generally, the pressure is inversely proportional to a resistance value $R_Z$ between points A and B shown in FIG. 8A. The resistance value $R_Z$ is obtained from formula (1):

$$R_Z = (VB - VA)/I_{TOUCH} \quad (1)$$

where, $$VA = VD \times Z_1/Q$$

$$VB = VD \times Z_2/Q$$

$Z_1$ and $Z_2$ are measured $Z_1$ position and $Z_2$ position, respectively, and Q is a resolving power of a coordinate detection control circuit (an A/D converter that is structured with a circuit that subjects a detected voltage value to A (analog)/D (digital) conversion to obtain digital coordinates). For example, when the resolving power is 12 bits, the resolution is 4096 (Q=4095 is obtained because 0 also is counted), and the range of X coordinate (X=$Z_1$) and the range of the Y coordinate (Y=$Z_2$) are 0 to 4095 (since some amount of voltage is consumed by the routing circuits and the control-related circuit of the touch panel, the actual range is narrower than the foregoing). For example, Q=256 when the resolving power of the coordinate detection control circuit is 8 bits; Q=1024 when 10 bits; and Q=4096 when 12 bits. As shown in FIG. 8B, in a case where the drive voltage of a prescribed voltage is applied from the coordinate detection control circuit or the power supply ($V_{DD}$) 19 v across the $Y_+$ terminal and the X_ terminal, when the resistance value between the X_ terminal and the X_ terminal is $R_X$, based on that the resistance value between the points A and X_ is $R_{XA} \times X/Q$, the following is derived:

$$I_{TOUCH} = VA/R_{XA} = (V_D \times Z_1 Q)/R_{XA}$$

Here, FIG. 8A is a view showing XY coordinate measurement of the resistive film type touch panel 2, and FIG. 8B is a view showing pressing force measurement of the resistive film type touch panel 2. With reference to FIG. 8A, the panel drive voltage is applied from the power supply 20v to the $X_+$ terminal and the X_ terminal, and the X coordinate position can be read from the $Y_+$ terminal. With reference to FIG. 8B, the panel drive voltage is applied from the power supply 19v to the $Y_+$ terminal to the X_ terminal, and the $Z_2$ position can be read from the $X_+$ terminal, and the $Z_2$ position can be read from the Y_ terminal.

As shown in FIG. 8A, X is a measurement value of X position in a case where the coordinate detection control circuit attempts to detect the X coordinate position. Accordingly, substituting the formula of $I_{TOUCH}$ into formula (1), formula (2) is obtained. It is to be noted that, $I_{TOUCH}$ is a value of a current that flows when an input is received at the resistive film type touch panel 2 when connection is established as shown in FIG. 8B, and since the current is always constant in a serial path way, it can be obtained from the calculation formula stated above.

$$R_Z = \{[V_D \times (Z_2 - Z_1)/Q]/[V_D \times Z_1/Q]\} \times R_{XA} = R_X \times X/Q$$
$$[(Z_2/Z_1) - 1] \quad (2)$$

In a case where the resistive film type touch panel 2 is not touched by a finger or a pen, the resistance value $R_Z$ in the Z direction (thickness direction) of the resistive film type touch panel 2 approximates infinity. When a force from a finger, a pen, or the like acts upon the resistive film type touch panel 2, a current flows and the resistance value assumes a value of several hundreds to 1 kΩ, as being inversely proportional to the pressure (P) applied to the resistive film type touch panel 2. That is, the pressure P on the resistive film type touch panel 2 can be expressed as the function of $R_Z$, and is calculated by the following formula (3):

$$P = \alpha - \beta \times R_Z \quad (3)$$

Where α and β are positive real values obtained from experiments.

In the calculation method described above, from the $Z_1$ position and the $Z_2$ position (XY coordinates) and the $R_X$ being the resistance value between the $X_+$ terminal and the X_ terminal, the resistance value at the touch portion between the upper and lower electrodes is calculated. Since the resistance value of the touch portion between the upper and lower electrodes changes when the pressing pressure and the pressed area change, a relative change in the pressing pressure (and the pressed area) can be detected.

With such a structure, by the pressure-sensitive ink layer 30 caused to be interposed between the movable electrode 22 and the fixed electrode 24 when the movable electrode 22 and the fixed electrode 24 are brought into contact with each other, a change in the magnitude of the force acted upon the movable electrode film 21 can be detected.

It is to be noted that, the present invention is not limited to the foregoing embodiments, and can be carried out in various other modes.

For example, though the description has been given of the electronic paper as one example of the paper-like thin-type display, the present invention is not limited thereto. The present invention is to provide an effective solution means to any other paper-like thin-type display in addition to the electronic paper that suffers from the problems described above.

Further, the resistive film type touch panel may be made of strip-like electrodes in which a plurality of movable electrodes and a plurality of fixed electrodes are disposed, and may be disposed to cross one another forming 90 degrees, to form a matrix.

Further, since the thin-type display is disposed on the resistive film type touch panel, the movable electrode 22, the fixed electrode 24, and the pressure-sensitive ink layer 30 can be structured using opaque materials.

By properly combining arbitrary embodiments of the aforementioned various embodiments, the effects owned by each of them can be made effectual.

INDUSTRIAL APPLICABILITY

The installation structure of a thin-type display and a resistive film type touch panel, the resistive film type touch panel unit with front-surface protrusions, and the thin-type display unit with back-surface protrusions of the present invention exhibit excellent visibility of the electronic paper, and an input thereto can easily be carried out with a pen or a finger. The present invention is useful as a device such as that uses a thin-type display such as electronic paper and a resistive film type touch panel, or as a component of the device.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. An installation structure of a thin-type display and a resistive film type touch panel, comprising:
   a paper-like thin-type display;
   a resistive film type touch panel that is disposed on a back surface side of the thin-type display; and
   a multitude of protrusions that are disposed between the thin-type display and the resistive film type touch panel and that are fixed to the resistive film type touch panel,
   wherein the resistive film type touch panel includes a movable electrode film, and the multitude of protrusions are disposed on a surface of the moveable electrode film of the resistive film type touch panel,
   wherein when a load is applied onto a front surface of the thin-type display, a protrusion locally pushes in the moveable electrode film of the resistive film type touch panel to form an input protrusion on a surface opposite to the surface, where the multitude of protrusions are disposed, of the moveable electrode film of the resistive film type touch panel, and
   wherein the formed input protrusion makes a local input.

2. The installation structure of the thin-type display and the resistive film type touch panel according to claim 1, wherein the multitude of protrusions are present more densely in a peripheral portion of the thin-type display and the resistive film type touch panel than in a central portion of the thin-type display and the resistive film type touch panel.

3. The installation structure of the thin-type display and the resistive film type touch panel according to claim 1, wherein the multitude of protrusions are greater in height in a peripheral portion of the thin-type display and the resistive film type touch panel than in a central portion of the thin-type display and the resistive film type touch panel.

4. The installation structure of the thin-type display and the resistive film type touch panel according to claim 1,
   wherein the multitude of protrusions are provided by molding one surface of a flexible sheet, and
   wherein a surface of the flexible sheet opposite to a protrusion surface is entirely bonded to the resistive film type touch panel.

5. The installation structure of the thin-type display and the resistive film type touch panel according to claim 1,
   wherein the multitude of protrusions are formed by an application and curing of a light-curable resin to one side of a flexible sheet, and
   wherein a surface of the flexible sheet opposite to a projection formed surface is entirely bonded to the resistive film type touch panel.

6. The installation structure of the thin-type display and the resistive film type touch panel according to claim 1, wherein the multitude of protrusions are formed by a direct application and curing of a light-curable resin to the resistive film type touch panel.

7. The installation structure of the thin-type display and the resistive film type touch panel according to claim 1, wherein each protrusion of the multitude of protrusions has a dome-like shape.

8. The installation structure of the thin-type display and the resistive film type touch panel according to claim 1, wherein each protrusion of the multitude of protrusions has a diameter of 1 to 2 mm and a height of 100 to 1000 μm, and an interval between adjacent protrusions of the multitude of protrusions falls within a range of 1 to 2 mm.

9. A resistive film type touch panel unit with front-surface protrusions to be used for the installation structure according to claim 1, comprising:
   the resistive film type touch panel of the installation structure; and
   the multitude of protrusions of the installation structure fixed on a front surface side of the resistive film type touch panel.

10. The installation structure of the thin-type display and the resistive film type touch panel according to claim 1,
    wherein the movable electrode film includes a movable electrode formed on a lower surface thereof,
    wherein the resistive film type touch panel includes a fixed electrode-supporting member including a fixed electrode formed on an upper surface thereof,
    wherein the resistive film type touch panel includes a plurality of spacers,
    wherein the movable electrode film and the fixed electrode-supporting member of the resistive film type touch panel are formed so as to face each other, and
    wherein the movable electrode and the fixed electrode are formed so as to face each other, having the plurality of spacers interposed therebetween.

* * * * *